(12) United States Patent
Hopkins et al.

(10) Patent No.: US 6,793,182 B2
(45) Date of Patent: Sep. 21, 2004

(54) WINDOW ATTACHMENT SYSTEM

(75) Inventors: Jonathan L. Hopkins, Lynnwood, WA (US); Paul A. Ely, Monroe, WA (US); Edward H. Chue, Everett, WA (US)

(73) Assignee: The Boeing Company, Chicago, IL (US)

(*) Notice: Subject to any disclaimer, the term of this patent is extended or adjusted under 35 U.S.C. 154(b) by 100 days.

(21) Appl. No.: 10/106,688

(22) Filed: Mar. 25, 2002

(65) Prior Publication Data

US 2003/0178531 A1 Sep. 25, 2003

(51) Int. Cl.$^7$ .................................................. B64C 1/14
(52) U.S. Cl. ................................. 244/129.3; 244/129.4
(58) Field of Search ........................ 244/129.3, 129.4; 49/502, 54, 501; 196/201, 146.15; 52/208

(56) References Cited

U.S. PATENT DOCUMENTS

| | | | |
|---|---|---|---|
| 2,722,170 A | | 11/1955 | Broberg |
| 3,906,669 A | * | 9/1975 | Vorguitch ..................... 49/372 |
| 4,364,533 A | * | 12/1982 | Pompei et al. ........... 244/129.3 |
| 4,541,595 A | | 9/1985 | Fiala et al. |
| 5,271,581 A | * | 12/1993 | Irish ......................... 244/129.3 |
| 5,467,943 A | * | 11/1995 | Umeda ..................... 244/129.3 |
| 6,082,674 A | | 7/2000 | White et al. |
| 6,227,491 B1 | | 5/2001 | Stephan et al. |

FOREIGN PATENT DOCUMENTS

JP    58-20512    *    2/1983

* cited by examiner

Primary Examiner—Charles T. Jordan
Assistant Examiner—T. Nguyen
(74) Attorney, Agent, or Firm—Black Lowe & Graham PLLC; Dale C. Barr

(57) ABSTRACT

A readily attachable window assembly for efficient installation and maintenance of aircraft windows is provided. The aircraft has a sidewall having an inner perimeter that defines an opening. The window assembly includes an outer window frame. A center window frame is attached to the outer window frame, and an inner window frame is attached to the center window frame. The inner window frame is readily attachable to the sidewall adjacent to the opening of the inner perimeter. The inner window frame includes a releasable coupling mechanism that includes first and second engaging mechanisms that positionally lock the first mechanism to the second mechanism via a torsion spring assembly and engageable teeth of each mechanism. The first engaging mechanism is locked onto the sidewall when torque is applied through at least one pinhole. The window assembly is disengaged by disengaging the first and second engaging mechanisms via a disengagement tab.

12 Claims, 4 Drawing Sheets

WINDOW ATTACHMENT SYSTEM

FIELD OF THE INVENTION

This invention relates generally to an aircraft window assembly, and more particularly to a window attachment system for to a sidewall panel of an aircraft.

BACKGROUND OF THE INVENTION

Current window assembly designs for aircraft include the use of different hardware fastener mechanisms for affixing a window assembly to an aircraft sidewall. A typical window assembly includes a multi-frame window assembly attachable and affixable to the aircraft sidewall. The most common of these assemblies require the combination of hardware fastener mechanisms, typically brackets, and adhesives to affix the window assembly to an aircraft's fixed outer sidewall. The brackets are affixed, via the adhesive, to the sidewall. The window assemblies are then affixed to the brackets. In other installations, the window assemblies are affixed to the sidewall using both mechanical affixing and adhesive affixing. The installation of the brackets is very labor intensive and time consuming. This is because the adhesive typically has a long cure period and then must be sanded, along with the aircraft sidewall, before the window assembly can be affixed to the brackets. Further installation often requires specially designed tools. In addition, fuel economy is negatively affected as the brackets and adhesives add weight to the aircraft, which in turn adds to the operating cost of the aircraft. Often too, the brackets are very pliable and weak and are subject to increased maintenance and replacement costs.

Yet another problem with current designs is an inability to consistently and uniformly attach the brackets on the aircraft sidewall. This is because the brackets cannot be exactly placed when affixed with adhesives. This leads to increased assembly costs because installers must take more time to affix and adjust the brackets.

Additionally, because there is quite a variation in affixing mechanisms between various airplane models, standardization of the window assemblies across airplane models is difficult. Difficult access to whole or part of the window assembly makes standard window maintenance, like cleaning, expensive and time consuming. This is because maintenance must be done by removing the whole window assembly or accessing the whole sidewall.

Thus, there exists a need to provide an aircraft window assembly with a readily detachable window assembly for efficient and easy installation and maintenance of aircraft windows.

SUMMARY OF THE INVENTION

The present invention provides an aircraft window assembly with a readily attachable window assembly for efficient and easy installation and maintenance of aircraft windows.

The aircraft has a sidewall having an inner perimeter that defines an opening. The window assembly includes an outer window frame. A center window frame is attached to the outer window frame, and an inner window frame is attached to the center window frame. The inner window frame is readily attachable to the sidewall adjacent to opening of the inner perimeter. The inner window frame includes a releasable coupling mechanism that includes first and second engaging mechanisms. The first and second engaging mechanisms each include a flange with one or more teeth to engage one another when torque is applied through one of several pinholes on the periphery of the inner window frame via a torsion spring assembly. The window assembly is disengaged by disengaging the first and second engaging mechanisms via a disengagement tab.

Thus, the present invention permits aircraft window assemblies to be installed without use of unnecessary adhesion or special tools. As a result, window assemblies can be installed in less time and with reduced costs. Further, window assembly installation can be standardized, and maintenance of installed window assemblies is reduced.

BRIEF DESCRIPTION OF THE DRAWINGS

The preferred and alternative embodiments of the present invention are described in detail below with reference to the following drawings.

DETAILED DESCRIPTION OF THE INVENTION

The present invention provides a window assembly.

Figure 1:
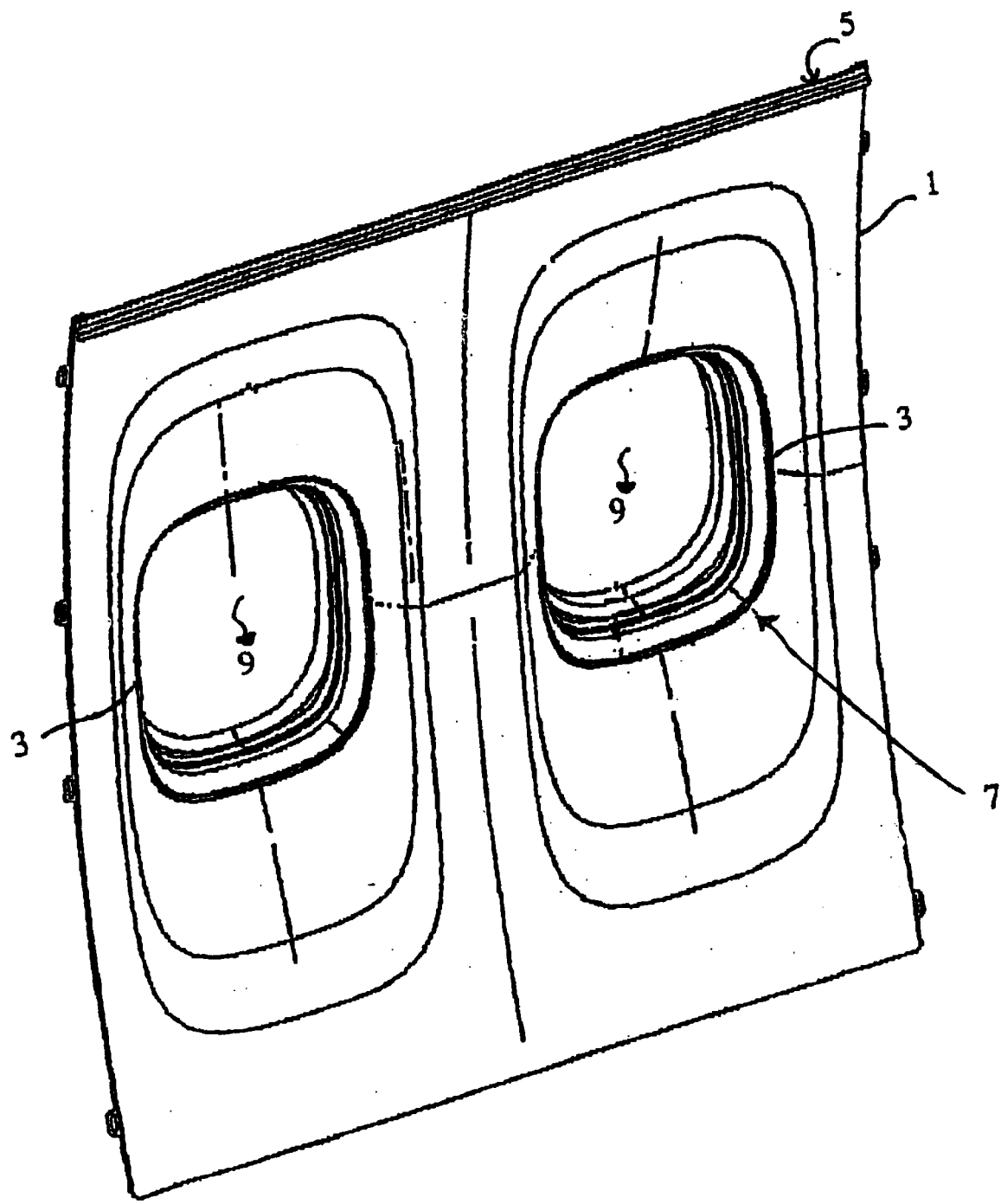
FIG. 1 depicts a section of an aircraft cabin with a cabin side view of a pair of window assemblies according to the present invention.

FIG. 1 depicts a section of an aircraft cabin sidewall 1 with a cabin side view of a pair of window assemblies 3 according to the present invention. In a presently preferred embodiment, an inner perimeter 7 of an outer sidewall 5 of the aircraft cabin sidewall 1 serves as the structure for defining an opening 9 for the window assemblies 3.

Figure 2:
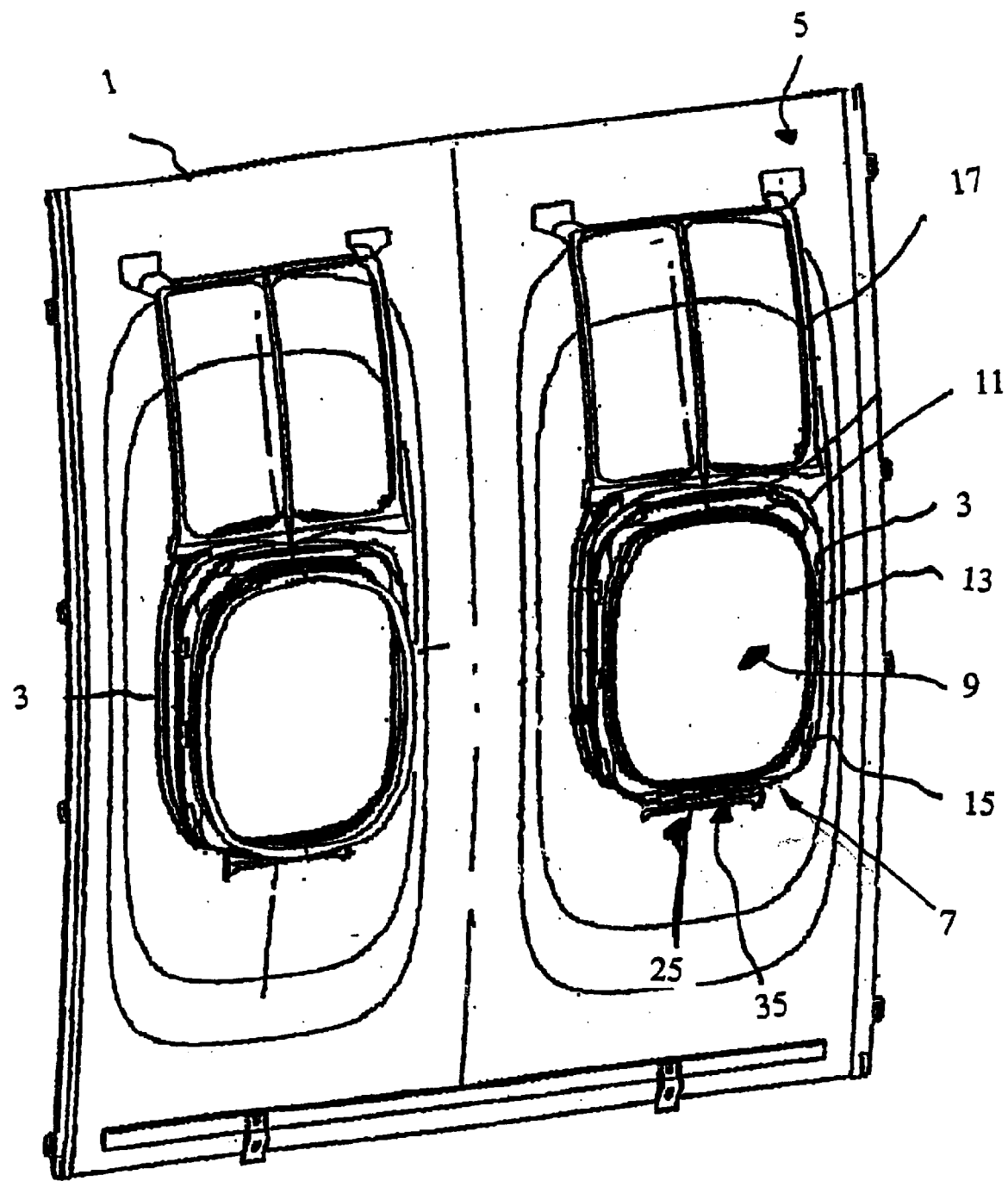
FIG. 2 depicts a view of a section of an outer sidewall opposite an aircraft cabin.

FIG. 2 depicts a section view of an outer sidewall 5 opposite an aircraft cabin sidewall 1 view of a pair of window assemblies 3 according to the present invention. The outer sidewall 5 includes the inner perimeter 7 defining the opening 9. The opening 9 serves to index a location for the installation of the window assembly 3. The window assembly 3 includes a coupled inner window frame 11, center window frame 13 and outer window frame 15. The coupling of the inner, center and outer window frame 11, 13, and 15, is well known in the art, and a description is not necessary for an understanding of the invention. In a preferred embodiment, the window assembly 3 further includes a sun-shade guide tract 17.

Figure 3:
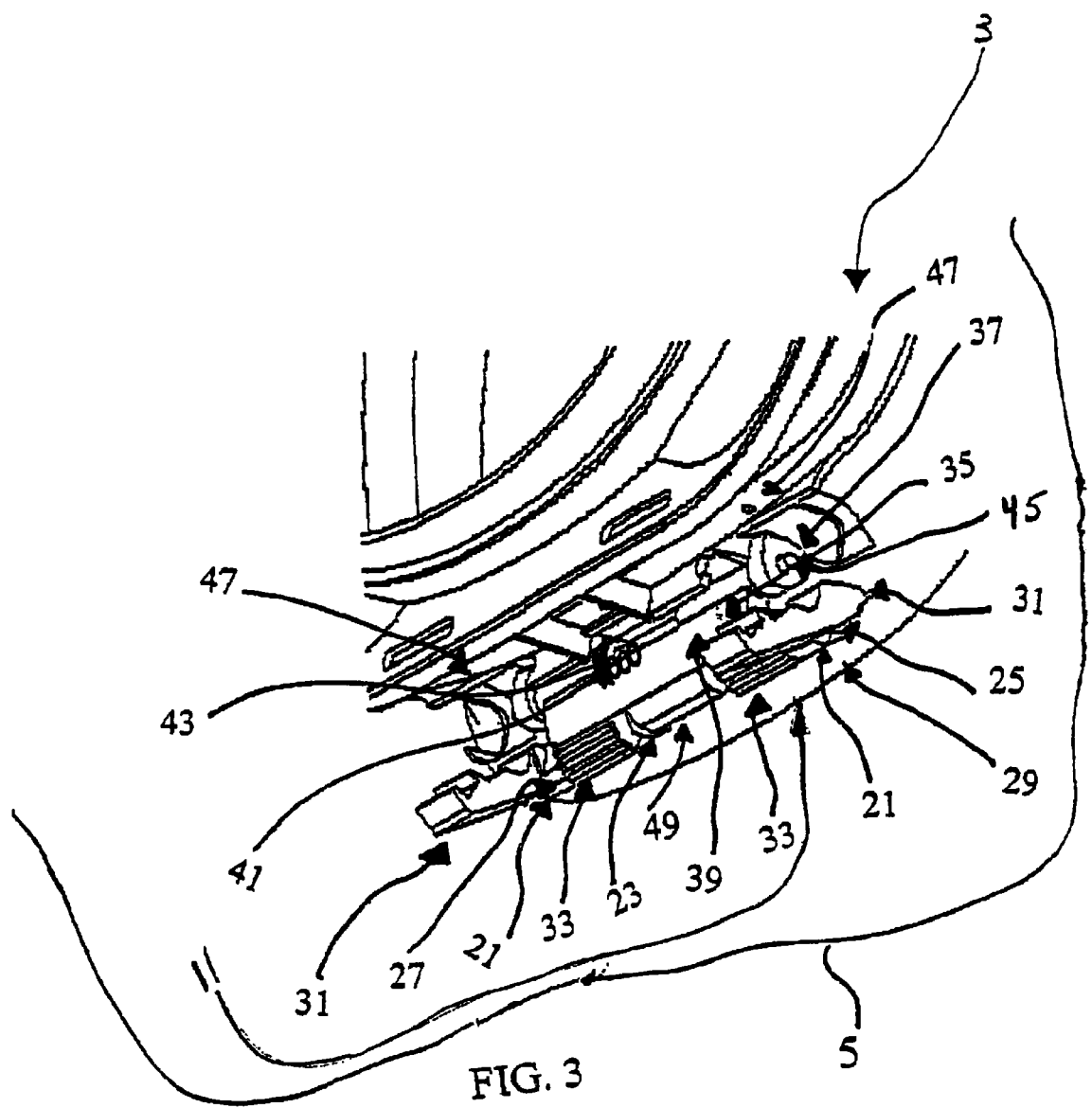
FIG. 3 depicts a view in the direction of an aircraft cabin of a lower portion of a readily attachable window assembly in an engaged position.
Figure 4:
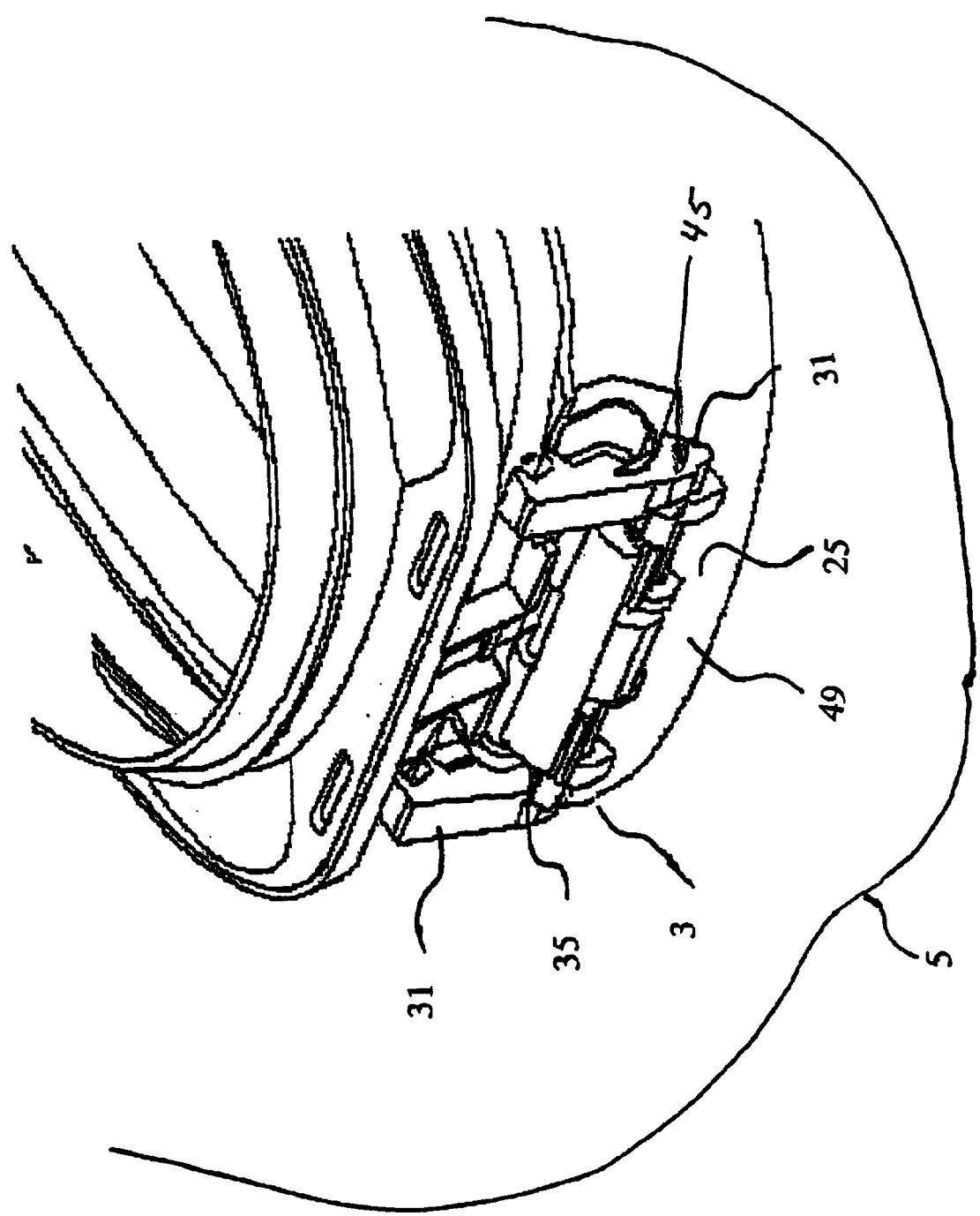
FIG. 4 depicts a view in the direction of an aircraft cabin of a lower portion of a readily attachable window assembly in a disengaged position.

In a presently preferred embodiment, the window assembly is coupled to the outer sidewall 5 in the indexed location of the opening 9 via a first engaging mechanism 25 and second engaging mechanism 35 as is further illustrated in FIGS. 3 and 4. The first and second engaging mechanisms 25 and 35 facilitate the coupling and decoupling of the window assembly 3 from the opening 9 in the outer sidewall 5 without having to remove the outer sidewall 5 to access the window assembly 3.

FIG. 3 depicts a view in the direction of an aircraft cabin of a lower portion of a readily attachable window assembly 3 coupled to an aircraft outer sidewall 5. The inner window frame 11 of the window assembly 3 is formed with longitudinal protrusions along the engageable lower edge periphery which include one or more elastically deformable hooks 21 and bosses 23. The hooks 21 and bosses 23 provide attachment functionality and location indexing between the inner window frame 11 and the first engaging mechanism 25. In a preferred embodiment, the hooks 21 and bosses 23 are molded of the same material, for example, thermoplastics, as the base part of the inner window frame 11. In an alternative embodiment, the hooks 21 and bosses 23 are formed of other material, for example, titanium, and attached independently to the inner window frame 11.

In a preferred embodiment, the first engaging mechanism 25 includes two engaging flanges 27, 29 each formed with independently rotatable hooked arms 31 and toothed engaging assemblies 33. Each engaging flange 27, 29 is shaped to be assembled into the deformable hooks 21 and bosses 23 associated with the inner window frame 11 of the window assembly 3 so that each engaging flange 27, 29 is independently engageable to the second engaging mechanism 35. The rotatable hooked arms include a locking boss 45 which engages the inner perimeter 7 of the sidewall 5.

The second engaging mechanism 35 includes a rotatable toothed engaging assembly 39. The second engaging mechanism 35 further includes a torsion spring assembly 41. The torsion spring assembly includes the torsion spring 43 set over a spring supporting rod 45 and placed center to the first and second engaging mechanisms 25 and 35. The torsion spring assembly 41 provides a force tension to engage the first and second engaging mechanisms 25 and 35, in a locked position relative to the torque created by the torque applied to each independently rotatable hooked arm 31 and toothed engaging assemblies 33, 39. The hooked arms 31 are independently rotated into the engaged position by accessing one or more pin holes 47 with a pin tool along the perimeter of the inner window frame 11. The position of the inner window frame 11 is adjusted by applying an appropriate amount of torque to the hooked arms 31 via the pin tool. During rotation, the toothed assemblies 33, 39 click against each other. The teeth of the toothed assemblies 33, 39 are designed to allow rotation in one direction, but not the other direction. This allows the window assembly 3 to be continuously tightened against the sidewall periphery without the rotatable hooked arms 31 from unexpectedly releasing torque in the opposite direction unless the toothed assemblies 33, 39 have been manually disengaged as described below.

As shown in FIG. 4, the second engaging mechanism 35 further includes a disengagement tab 49 for releasably disengaging the engaged toothed engaging assemblies 33, 39 of the first and the second engaging mechanisms 25 and 35 thus allowing the window assembly 3 to be decoupled from the aircraft sidewall 5.

By way of a non limiting example, when installing the window assembly 3, an installer angles the window assembly 3 so that top of the window assembly 3 is angled toward the aircraft sidewall 5. The installer then slides the upper portion of the window assembly 3 up and into the sidewall opening 9 until the bonded tabs (not shown) on the sidewall 5 are inserted into the pockets (not shown) located on the top of the window assembly 3. The window assembly 3 is now installed to the top portion of the opening 9 with the first and second engaging mechanisms 25 and 35 still unengaged and therefore not coupled to the sidewall 5. The lower edge of the window assembly 3 is pushed straight in toward the sidewall 5. The window assembly 3 is now in the final position. However, the window assembly 3 is not locked in place. While continuing to push on the lower edge to ensure that the window assembly 3 is seated well, the installer accesses the pin hole 47 and uses a pin tool to engage each independent rotatable hooked arm 31 until it can be rotated no further. The window assembly 3 is now coupled to the aircraft sidewall 5.

FIG. 4 depicts a view in the direction of an aircraft cabin of a lower portion of a readily attachable window assembly 3 in a disengaged position decoupled from an aircraft sidewall 5. As FIG. 3 illustrates, the first engaging mechanism 25 and the second engaging mechanism 35 are engaged, thus coupling the window assembly 3 to the aircraft sidewall 5. Once the window assembly 3 is installed, the entire assembly 3 is hidden behind the sidewall 5. The disengagement tab 49 is accessed with a "skin" tool, or putty knife. This tool is slid between the lower center portion of the inner window frame 11 and the sidewall 5 until the tool comes into contact with the tab (not visible) of the disengagement tab 49. Additional force is then required to push back on the tab against the spring force caused by the tension of the torsion spring assembly 41 until the teeth-to-teeth engagement of the toothed engaging assemblies 33, 39 of the first and the second engaging mechanisms 25 and 35 is removed. The disengagement tab 49 is then held out of position, and the window assembly 3 is then pulled inboard. The lack of holding force from the teeth allows each rotatable hooked arm 31 to rotate freely back to the lowered (disengaged) position as the window assembly 3 is pulled out.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A releasable window assembly for an aircraft, the aircraft having a sidewall with an inner perimeter that defines an opening, the assembly comprising:
    an outer window frame;
    a center window frame attached to the outer window frame; and
    an inner window frame attached to the center window frame and releasably attached to the sidewall, the inner window frame including a releasable coupling mechanism that includes at least one deformable hook and boss for releasably attaching the inner window frame to the sidewall and for indexing a location for attaching the inner widow frame to the sidewall
    wherein the releasable coupling mechanism includes first and second engaging mechanisms, wherein the first engaging mechanism includes a first flange with a first plurality of teeth and the second engaging mechanism further includes a second flange, the first plurality of teeth being arranged to toothedly engage the second flange.

2. The window assembly of claim 1, wherein the second flange includes a second plurality of teeth, the second plurality of teeth being arranged to toothedly engage the first plurality of teeth and rotatively self-lock in a first direction and not in a second direction that is opposite the first direction.

3. The window assembly of claim 1, wherein the first engaging mechanism further includes one or more rotatively coupled hooked arms to engage the first and second engaging mechanisms.

4. The window assembly of claim 3, wherein the first engaging mechanism further includes a boss which engages the sidewall when the first engaging mechanism is rotated into position.

5. The window assembly of claim 1, wherein the second engaging mechanism further includes a torsion spring assembly for applying torque to engage the second plurality of teeth and the first plurality of teeth.

6. The window assembly of claim 5, wherein the torsion spring assembly further includes a disengagement tab mechanism arranged for disengaging the first and second engaging mechanisms.

7. The window assembly of claim 3, wherein the first engaging mechanism further includes one or more pin holes along a perimeter of the inner window frame arranged for rotating the hooked arm of the first engaging mechanism to lock the first engaging mechanism against the sidewall.

8. The window assembly of claim 7, wherein the one or more pin holes along the perimeter of the inner window frame permits independent rotation of the first engaging mechanism to lock the hooked arm against the sidewall.

9. A releasable window assembly for an aircraft, the aircraft having a sidewall with an inner perimeter that defines an opening, the assembly comprising:

an outer window frame;

a center window frame attached to the outer window frame; and an inner window frame attached to the center window frame and releasably attached to the sidewall, the inner window frame including a releasable coupling mechanism that includes at least one deformable hook and boss for releasably attaching the inner window frame to the sidewall and for indexing a location for attaching the inner widow frame to the sidewall;

wherein the releasable coupling mechanism further includes first and second engaging mechanisms;

wherein the first engaging mechanism includes a first flange with a first plurality of teeth and the second engaging mechanism includes a second flange with a second plurality of teeth, the second plurality of teeth being arranged to toothedly engage the first plurality of teeth; and wherein the second engaging mechanism further includes a torsion spring assembly for applying torque to engage the second plurality of teeth and the first plurality of teeth.

10. The window assembly of claim 9, wherein the torsion spring assembly further includes a disengagement tab mechanism arranged for disengaging the first and second engaging mechanisms.

11. The window assembly of claim 9, wherein the first engaging mechanism further includes one or more pin holes along a perimeter of the inner window frame arranged for engaging the hooked arm to the sidewall.

12. The window assembly of claim 11, wherein the one or more pin holes along the perimeter of the inner window frame permits independently adjusting torsion of the first engaging mechanism, and the second engaging mechanism locks the first engaging mechanism in place via the torsion spring assembly.

* * * * *